(12) United States Patent
Shin et al.

(10) Patent No.: US 11,871,288 B2
(45) Date of Patent: Jan. 9, 2024

(54) METHOD AND DEVICE FOR TRANSMITTING AND RECEIVING SIGNALS IN WIRELESS COMMUNICATION SYSTEM

(71) Applicant: LG ELECTRONICS INC., Seoul (KR)

(72) Inventors: Seokmin Shin, Seoul (KR); Haewook Park, Seoul (KR); Kijun Kim, Seoul (KR); Hyunsoo Ko, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/162,979

(22) Filed: Feb. 1, 2023

(65) Prior Publication Data
US 2023/0189088 A1    Jun. 15, 2023

Related U.S. Application Data

(63) Continuation of application No. PCT/KR2021/009716, filed on Jul. 27, 2021.

(30) Foreign Application Priority Data

Aug. 6, 2020  (KR) .......... 10-2020-0098793
Oct. 21, 2020  (KR) .......... 10-2020-0137098
Apr. 2, 2021  (KR) .......... 10-2021-0043567

(51) Int. Cl.
*H04W 4/00* (2018.01)
*H04W 36/00* (2009.01)
*H04B 7/185* (2006.01)
*H04W 36/08* (2009.01)
*H04W 56/00* (2009.01)

(52) U.S. Cl.
CPC .... *H04W 36/0061* (2013.01); *H04B 7/18513* (2013.01); *H04W 36/08* (2013.01); *H04W 56/0045* (2013.01)

(58) Field of Classification Search
CPC ............ H04W 36/08; H04W 56/0045; H04W 36/0061; H04B 7/18513
See application file for complete search history.

(56) References Cited

U.S. PATENT DOCUMENTS

2022/0053555 A1* 2/2022 Chen ................ H04B 7/1853
2022/0279394 A1* 9/2022 Gao ................. H04B 7/18541
2022/0386259 A1* 12/2022 Chen ................ H04L 5/0048
2023/0022834 A1* 1/2023 Wu .................. H04W 36/0005

* cited by examiner

*Primary Examiner* — Justin Y Lee
(74) *Attorney, Agent, or Firm* — LEE, HONG, DEGERMAN, KANG & WAIMEY

(57) ABSTRACT

A method and device for transmitting and receiving signals in a wireless communication system according to an embodiment of the present invention receive Random Access Channel (RACH) configurations, and transmit random access preambles on a specific RACH occasion (RO) on the basis of the RACH configurations. The number of reference points in a cell is derived on the basis of the number of the RACH configurations, and the reference points can have respective initial Timing Advance (TA) values for the RACH process.

6 Claims, 10 Drawing Sheets

[Fig. 1]
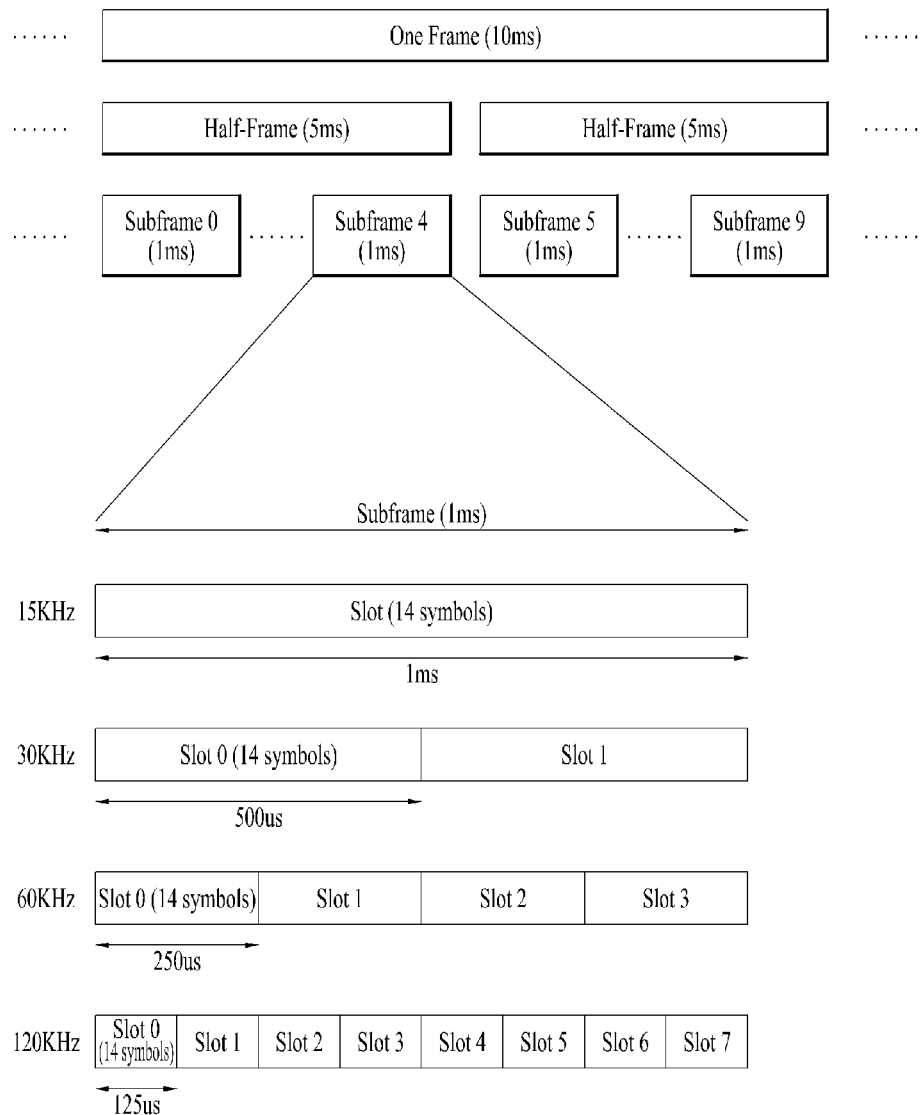

[Fig. 2]
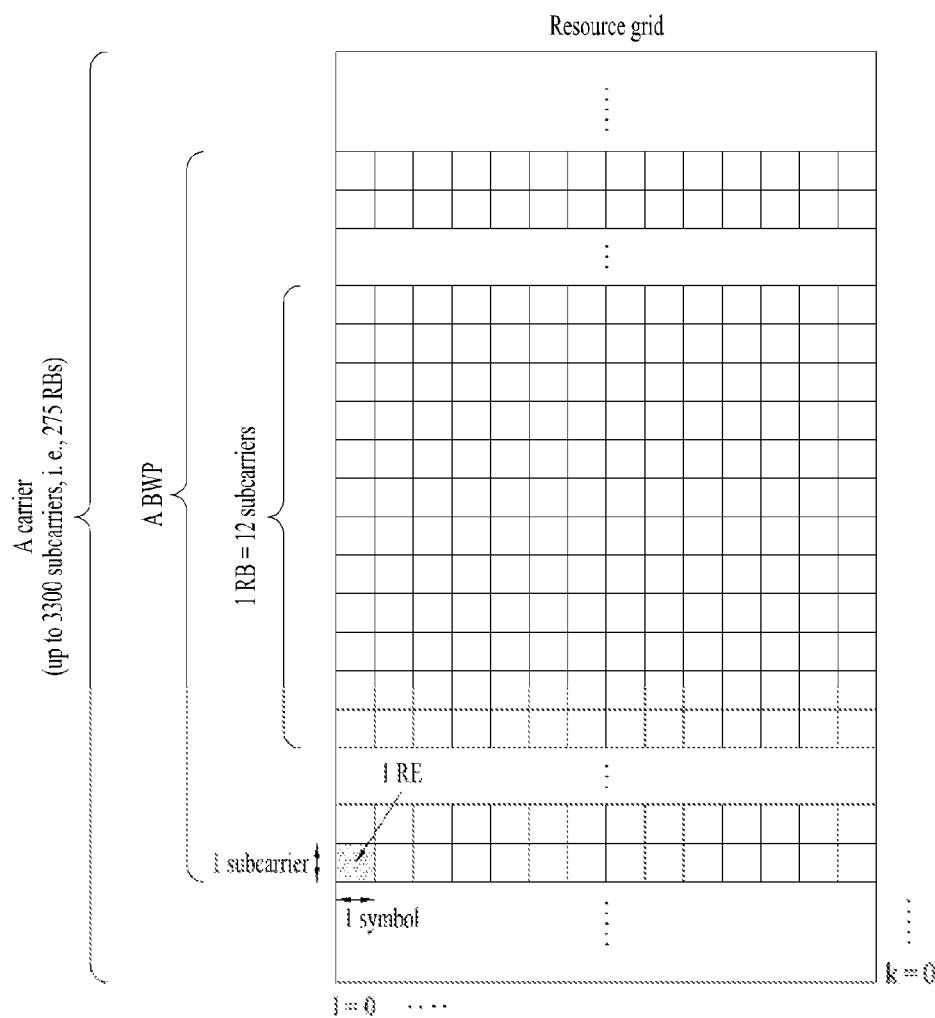

[Fig. 3]
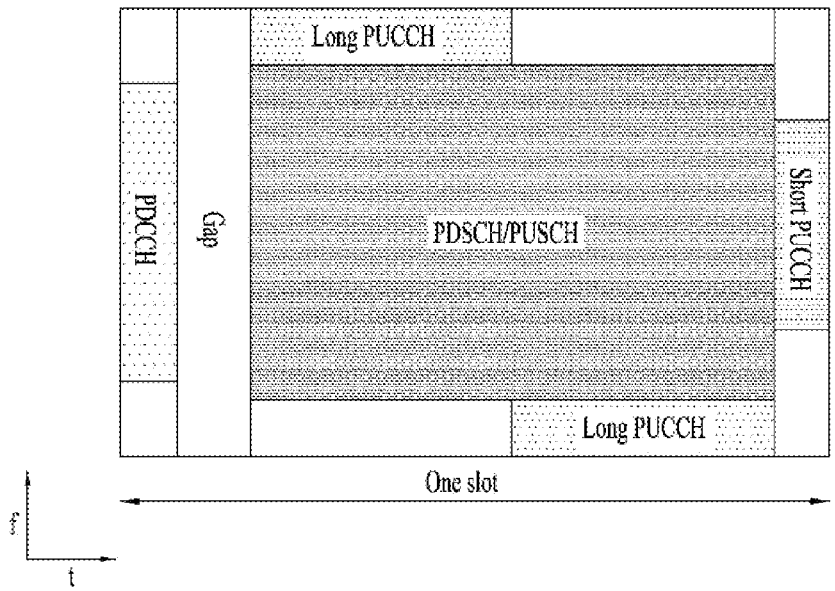
[Fig. 4]
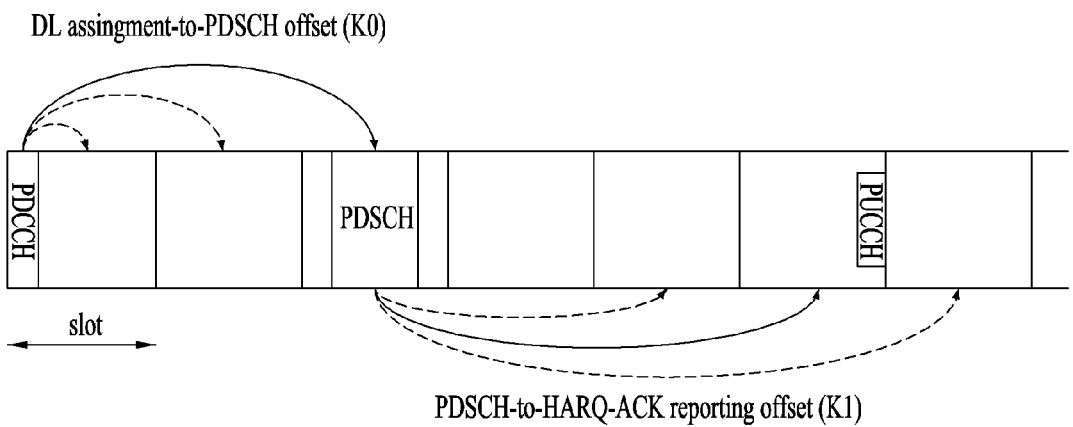
[Fig. 5]
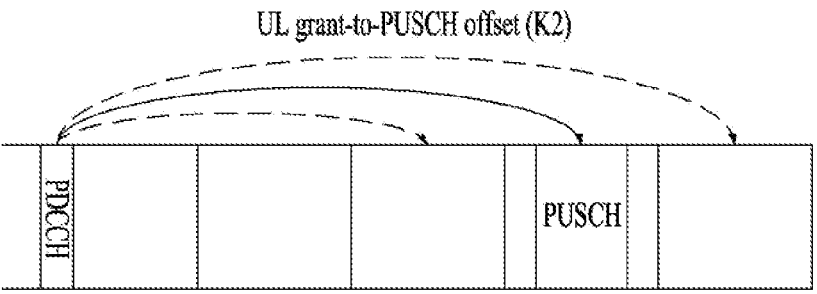

【Fig. 6】
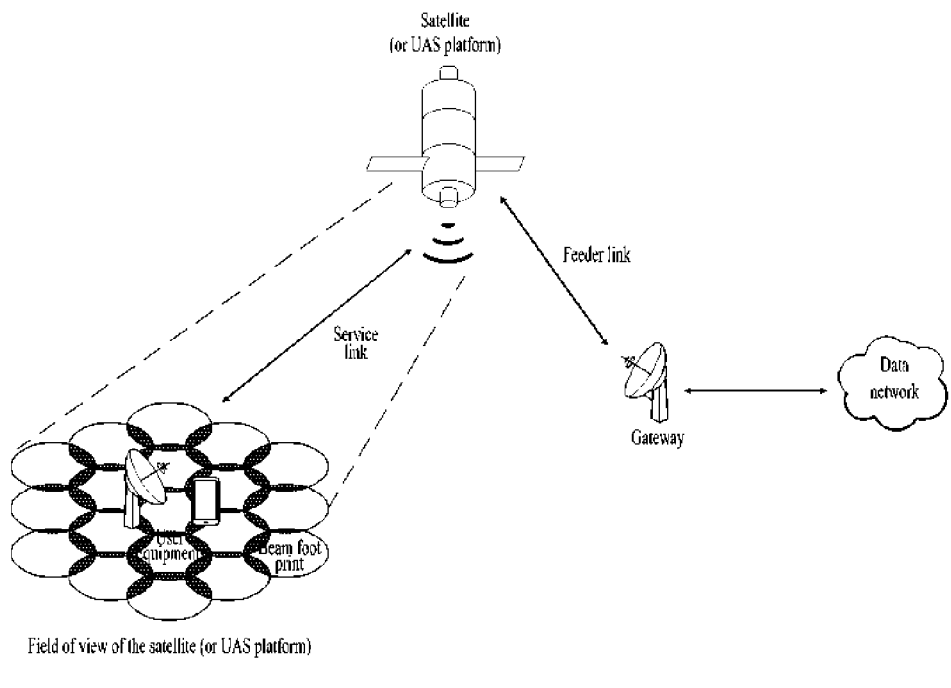
(a)
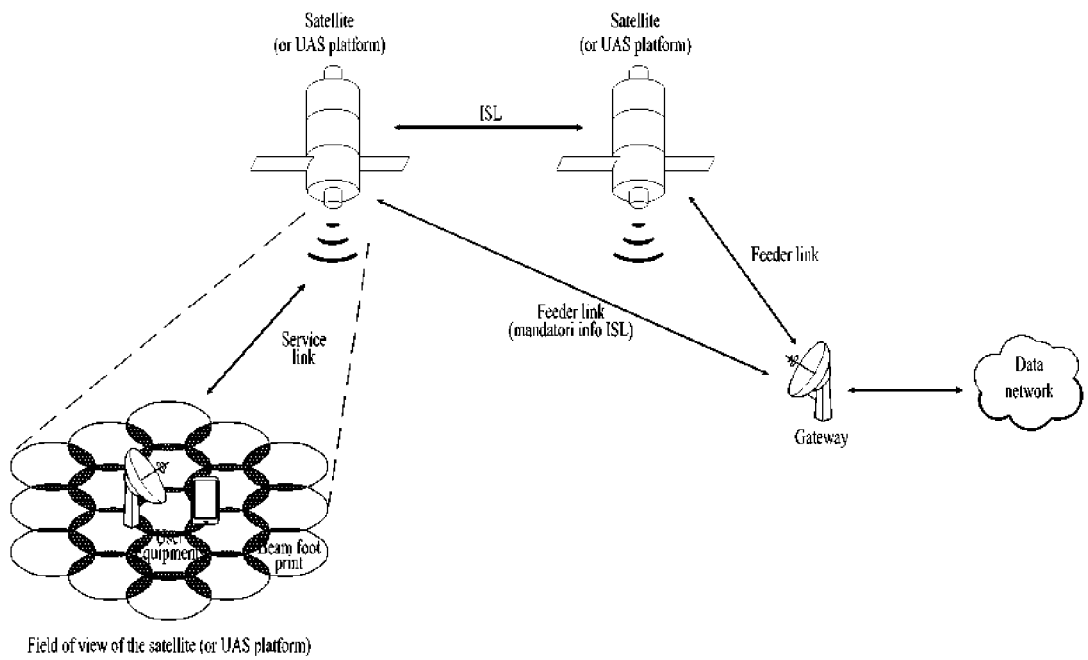

[Fig. 7]
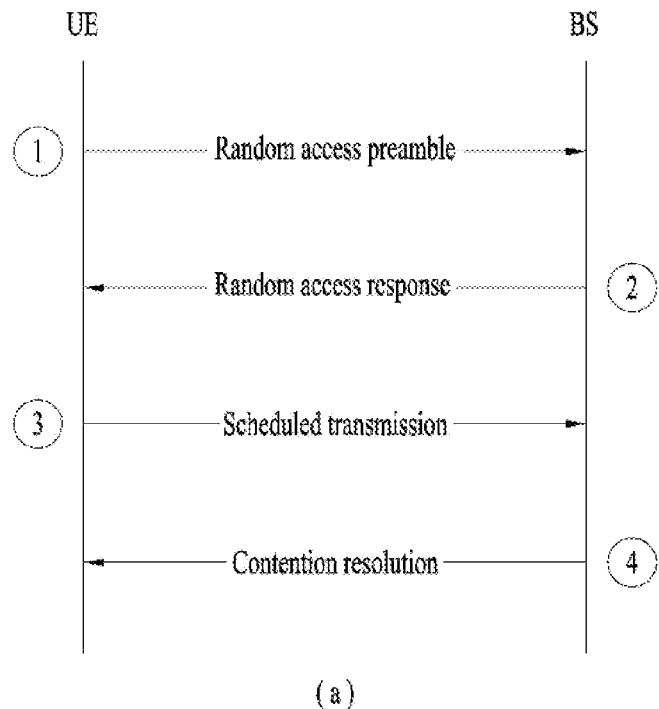
(a)
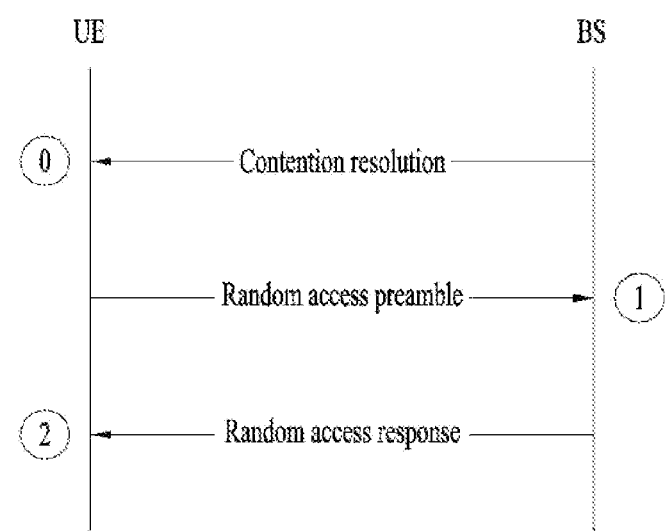
(b)

[Fig. 8]
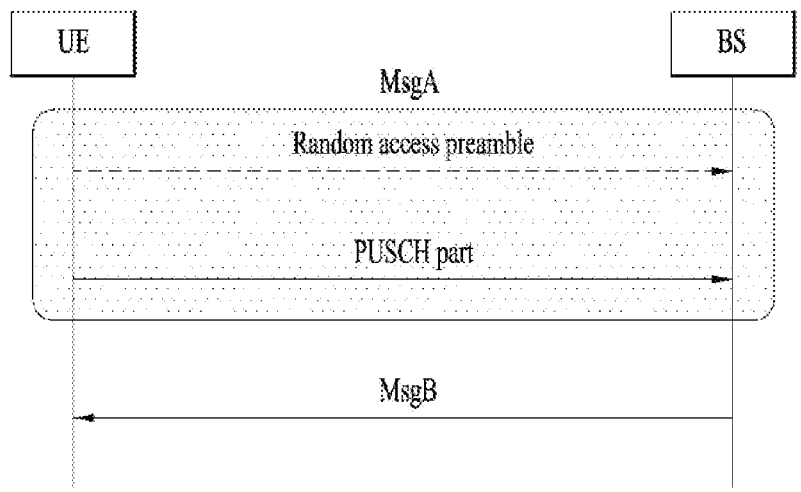
(a)
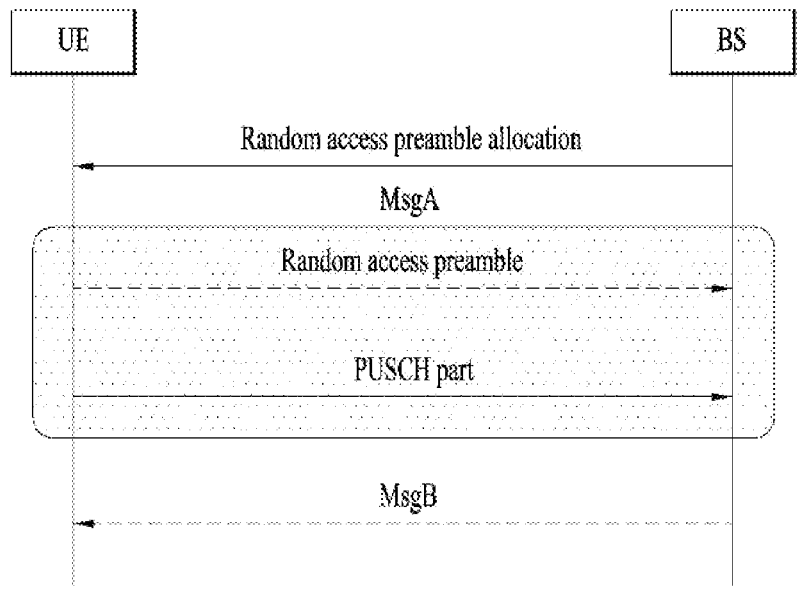
(b)

[Fig. 9]
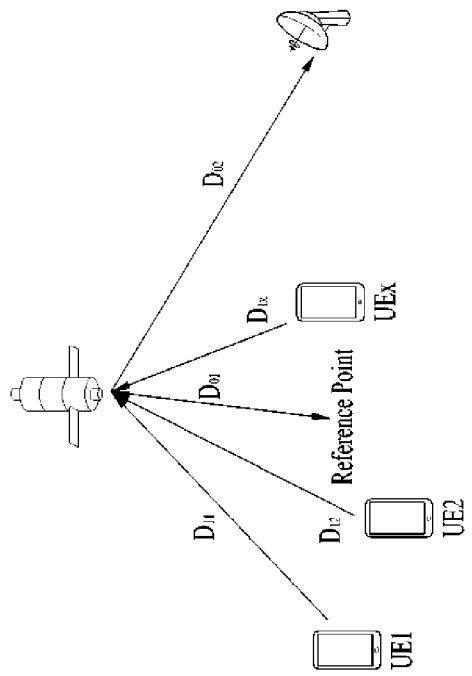
(b) Transparent payload
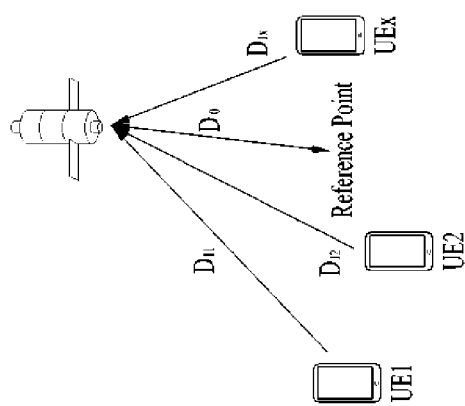
(a) Regenerative payload

[Fig. 10]
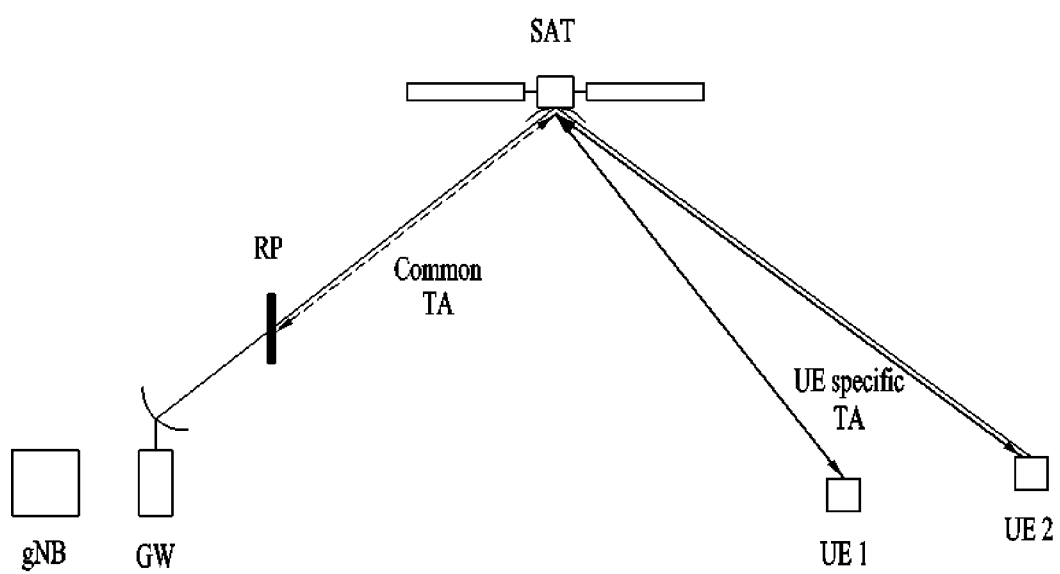

[Fig. 11]
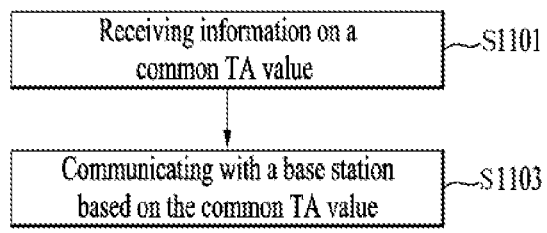
[Fig. 12]
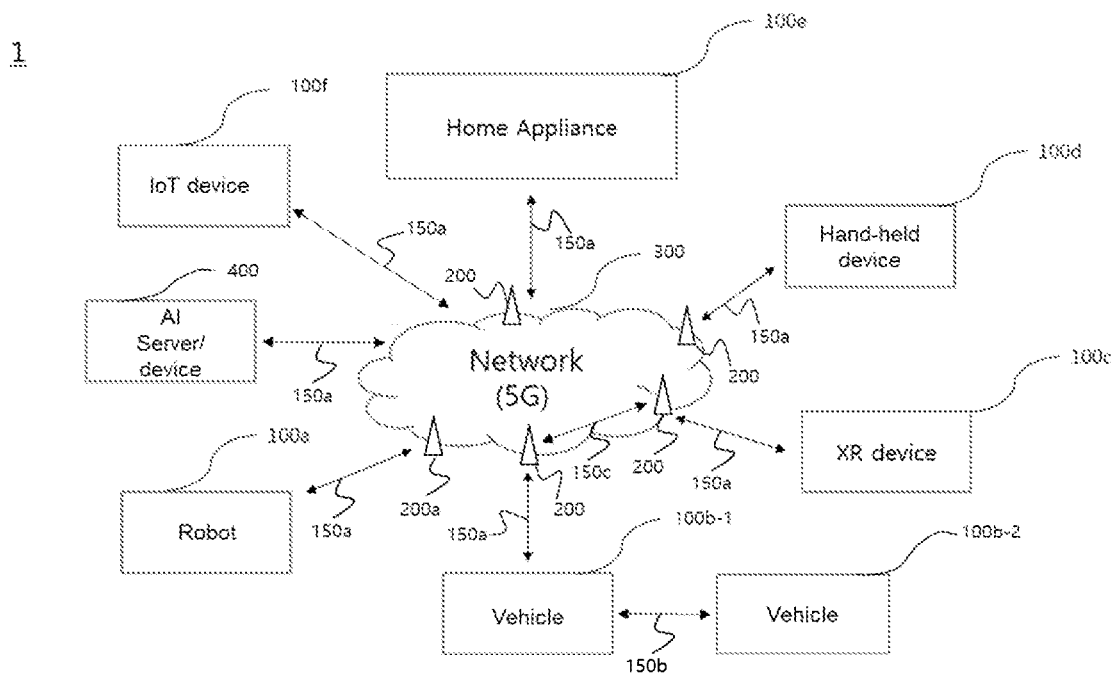

[Fig. 13]
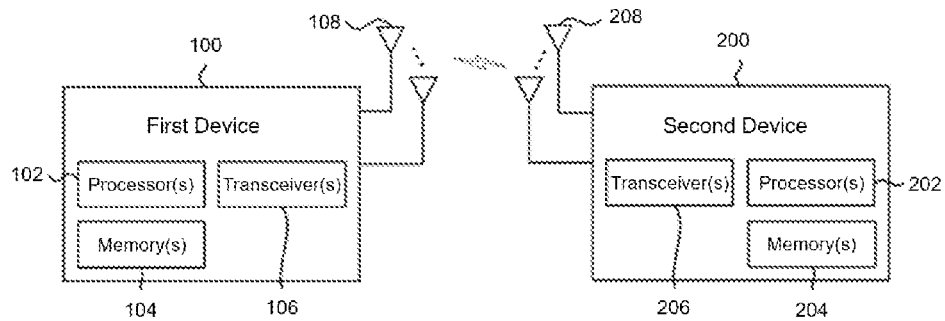
[Fig. 14]
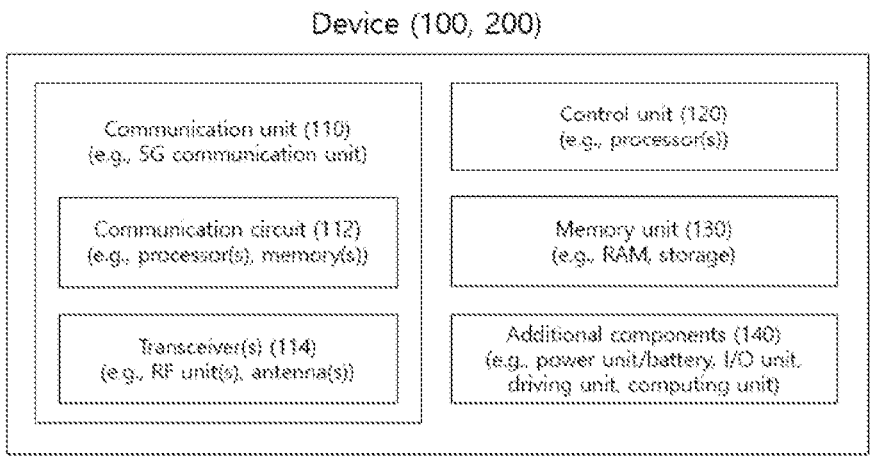
[Fig. 15]
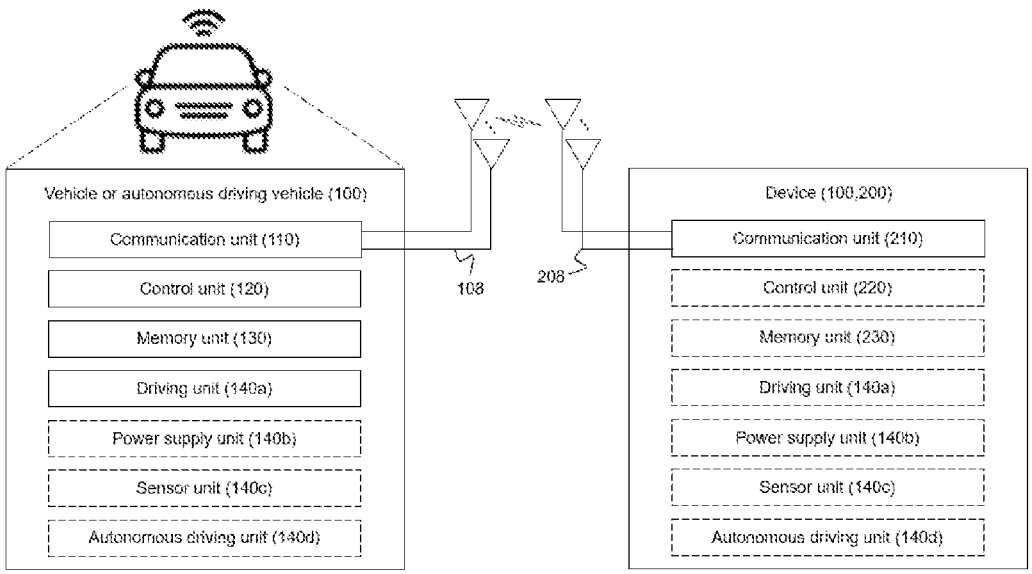

METHOD AND DEVICE FOR TRANSMITTING AND RECEIVING SIGNALS IN WIRELESS COMMUNICATION SYSTEM

CROSS-REFERENCE TO RELATED APPLICATIONS

This application is a continuation of International Application No. PCT/KR2021/009716, filed on Jul. 27, 2021, which claims the benefit of earlier filing date and right of priority to Korean Application Nos. 10-2020-0098793, filed on Aug. 6, 2020, 10-2020-0137098, filed on Oct. 21, 2020, and 10-2021-0043567, filed on Apr. 2, 2021, the contents of which are all hereby incorporated by reference herein in their entireties.

TECHNICAL FIELD

The present disclosure relates to a method and apparatus for use in a wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISCLOSURE

Technical Task

One technical aspect of the present disclosure is to provide a method and apparatus for transmitting and receiving signals to efficiently perform a signal transmitting and receiving process in a wireless communication system supportive of NTN.

Technical tasks of the present disclosure are not limited to the above-described technical task, and other technical tasks may be inferred from the embodiments of the present disclosure.

Technical Solutions

The present disclosure provides a method of transmitting and receiving signals in a wireless communication system and apparatus therefor.

In one technical aspect of the present disclosure, provided is a method of transmitting and receiving signals by a user equipment supportive of a Non-Terrestrial Network (NTN) in a wireless communication system, the method including receiving information on a common Timing Advance (TA) value and communicating with a base station based on the common TA value, wherein the information may include information on a plurality of common TA values to be used during a specific time interval and wherein the common TA value may include a TA value applied between a satellite and a reference point.

In another technical aspect of the present disclosure, provided is a method of transmitting and receiving signals by a base station supportive of a Non-Terrestrial Network (NTN) in a wireless communication system, the method including transmitting information on a common Timing Advance (TA) value and communicating with a user equipment based on the common TA value, wherein the information may include information on a plurality of common TA values to be used during a specific time interval and wherein the common TA value may include a TA value applied between a satellite and a reference point.

In another technical aspect of the present disclosure, provided is a user equipment supportive of a Non-Terrestrial Network (NTN) to transmit and receive signals in a wireless communication system, the user equipment including at least one transceiver, at least one processor; and at least one memory operably connected to the at least one processor and storing instructions enabling the at least one processor to perform a specific operation when executed, the specific operation including receiving information on a common Timing Advance (TA) value and communicating with a base station based on the common TA value, wherein the information may include information on a plurality of common TA values to be used during a specific time interval and wherein the common TA value may include a TA value applied between a satellite and a reference point.

In another technical aspect of the present disclosure, provided is a base station supportive of a Non-Terrestrial Network (NTN) to transmit and receive signals in a wireless communication system, the base station including at least one transceiver, at least one processor, and at least one memory operably connected to the at least one processor and storing instructions enabling the at least one processor to perform a specific operation when executed, the specific operation including transmitting information on a common Timing Advance (TA) value and communicating with a user equipment based on the common TA value, wherein the information may include information on a plurality of common TA values to be used during a specific time interval and wherein the common TA value may include a TA value applied between a satellite and a reference point.

In another technical aspect of the present disclosure, provided is an apparatus for a user equipment supporting Non-Terrestrial Network (NTT), the apparatus including at least one processor and at least one computer memory operably connected to the at least one processor and enabling the at least one processor to perform an operation when executed, the operation including an operation of the signal transmitting and receiving method of the user equipment.

In another technical aspect of the present disclosure, provided is an apparatus for a base station supporting Non-Terrestrial Network (NTT), the apparatus including at least one processor and at least one computer memory operably connected to the at least one processor and enabling the at least one processor to perform an operation when executed, the operation including an operation of the signal transmitting and receiving method of the base station.

In further technical aspect of the present disclosure, provided is a computer-readable storage medium including at least one computer program supporting a Non-Terrestrial Network (NTN) to enable at least one processor to perform an operation, the operation including an operation of the signal transmitting and receiving method of the user equipment or the base station.

In the above methods and apparatuses, the information may include information on N common TA values for the specific time interval divided into N time intervals.

In the above methods and apparatuses, the information may include a representative common TA value and a delta TA value and during the specific time interval, the common TA value may increase by the delta TA value from the representative common TA value in every configured time interval.

In the above methods and apparatuses, the information may include a representative common TA value and during the specific time interval, the common TA value may be determined by updating the representative common TA value based on orbit, velocity and/or location of the satellite.

In the above methods and apparatuses, the information may include information on a plurality of the common TA values to be used during the specific time interval.

The communication devices may include an autonomous vehicle capable of communicating with another autonomous vehicle other than the user equipment, the network and the communication device at least.

The aspects of the present disclosure described above are only some of the preferred embodiments of the present disclosure, and various embodiments reflecting the technical features of the present disclosure may be derived and understood by those skilled in the art, to which the present disclosure pertains, based on the detailed description of the present disclosure described below.

Advantageous Effects

According to one embodiment of the present disclosure, when signal transmission/reception is performed in a wireless communication system supporting NTN, signal transmission/reception may be performed more efficiently through an operation differentiated from the related art.

Technical effects of the present disclosure are not limited to the above-described technical effect, and other technical effects may be inferred from the embodiments of the present disclosure.

DESCRIPTION OF DRAWINGS

FIG. 1 illustrates a radio frame structure.

FIG. 2 illustrates a resource grid during the duration of a slot.

FIG. 3 illustrates a self-contained slot structure.

FIG. 4 illustrates an acknowledgment/negative acknowledgment (ACK/NACK) transmission process.

FIG. 5 illustrates an exemplary PUSCH transmission process.

FIG. 6 shows an example of a wireless communication system for supporting an NTN.

FIGS. 7 and 8 show a random access process.

FIGS. 9 to 11 are diagrams for explaining an NTN system and a random access process according to an embodiment of the present disclosure.

FIGS. 12 to 15 show an example of apparatuses according to an embodiment of the present disclosure.

BEST MODE FOR DISCLOSURE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP NR 38.211: Physical channels and modulation 38.212: Multiplexing and channel coding 38.213: Physical layer procedures for control 38.214: Physical layer procedures for data 38.300: NR and NG-RAN Overall Description 38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A plurality of RB interlaces (simply, interlaces) may be defined in the frequency domain. Interlace m∈{0, 1, . . . , M−1} may be composed of (common) RBs {m, M+m, 2M+m, 3M+m, . . . }. M denotes the number of interlaces. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH; frequency/time resource allocation information on an uplink shared channel (UL-SCH); paging information on a paging channel (PCH); system information on a DL-SCH; time/frequency resource allocation information on a higher layer control message such as a random access response (RAR) transmitted over a PDSCH; transmit power control commands; and information on activation/deactivation of SPS/CS. Various DCI formats may be provided depending on information in DCI.

Table 4 shows DCI formats transmitted over the PDCCH.

TABLE 4

| DCI format | Usage |
| --- | --- |
| 0_0 | Scheduling of PUSCH in one cell |
| 0_1 | Scheduling of one or multiple PUSCH in once cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmission by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 5 shows the usage of the PDCCH and transport channels according to the type of RNTI. Here, the transport channel means a transport channel related to data carried by a PDSCH/PUSCH scheduled by the PDCCH.

TABLE 5

| RNTI | Usage | Transport Channel |
| --- | --- | --- |
| P-RNTI | Paging and System Information change notification | PCH(Paging Channel) |
| SI-RNTI | Broadcast of System Information | DL-SCH |
| RA-RNTI | Random Access Response | DL-SCH |
| Temporary C-RNTI | Contention Resolution (when no valid C-RNTI is available) | DL-SCH |
| Temporary C-RNTI | Msg3 transmission | UL-SCH |
| C-RNTI, MCS(Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS(Configued Scheduling)-RNTI | Configured scheduled unicast transmission (activation, reactivation and retransmission) | DL-SCH, UL-SCH |
| CS-RNTI | Configured scheduled unicast transmission (deactivation) | N/A |
| TPC(Transmit Power Control)-PUCCH-RNTI | PUCCH power control | N/A |
| TPC-PUSCH-RNTI | PUSCH power control | N/A |
| TPC-SRS-RNTI | SRS trigger and power control | N/A |
| INT(Interruption)-RNTI | Indication pre-emption in DL | N/A |
| SFI(Slot Format Indication)-RNTI | Slot Format Indication on the given cell | N/A |
| SP(Semi-persistent)-CSI(Channel State Information)-RNTI | Activation of Semi-persistent CSI reporting on PUSCH | N/A |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P)RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.

- controlResourceSetId: this parameter/information indicates the identifier (ID) of the CORESET.
- frequencyDomainResources: this parameter/information indicates frequency-domain resources of the CORESET. The frequency-domain resources may be indicated by a bitmap, and each bit corresponds to an RB group (=6 consecutive RBs). For example, the most significant bit (MSB) of the bitmap corresponds to the first RB group in the BWP. An RB group corresponding to a bit with a value of 1 may be allocated as a frequency-domain resource of the CORESET.
- duration: this parameter/information indicates time-domain resources of the CORESET. The parameter/information duration may indicate the number of consecutive OFDMA symbols included in the CORESET. For example, duration has a value of 1-3.
- cce-REG-MappingType: this parameter/information indicates a CCE-to-REG mapping type. An interleaved type and a non-interleaved type may be supported.
- precoderGranularity: this parameter/information indicates a precoder granularity in the frequency domain.
- tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.
- tci-PresentInDCI: this parameter/information indicates whether a TCI field is included in DCI.
- pdcch-DMRS-ScramblingID: this parameter/information indicates information used for initialization of a PDCCH DMRS scrambling sequence.

For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set. The SS set may be classified into a common search space (CSS) set or a UE-specific search space (USS) set.

Table 6 shows PDCCH search spaces.

TABLE 6

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI | Group signaling |
| UE Specific | UE Specific | C-RNTI, MCS-C-RNTI or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.

- searchSpaceId: this parameter/information indicates the ID of the SS set.
- controlResourceSetId: this parameter/information indicates the CORESET associated with the SS set.
- monitoringSlotPeriodicityAndOffset: this parameter/information indicates a PDCCH monitoring periodicity (in a unit of slot) and a PDCCH monitoring offset (in a unit of slot)
- monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol(s) corresponding to bit(s) with a value of 1 corresponds to the first symbol(s) in the CORESET in the slot.
- nrofCandidates: this parameter/information indicates the number of PDCCH candidates (e.g., one of 0, 1, 2, 3, 4, 5, 6, and 8) for each AL (where AL={1, 2, 4, 8, 16}).
- searchSpaceType: this parameter/information indicates whether the SS type is the CSS or USS.
- DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

UL Physical Channels/Signals (1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) PUCCH

A PUCCH may carry UCI. The UCI includes the following information.

Scheduling request (SR): The SR is information used to request a UL-SCH resource.

Hybrid automatic repeat and request acknowledgement) (HARQ-ACK): The HARQ-ACK is a signal in response to reception of a DL signal (e.g., PDSCH, SPS release PDCCH, etc.). The HARQ-ACK response may include positive ACK (ACK), negative ACK (NACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.

Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 7 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)

Supportable UCI payload size: up to K bits (e.g., K=2)

Number of OFDM symbols included in one PUCCH: 1 to X symbols (e.g., X=2)

Transmission structure: only a UCI signal is configured with no DM-RS, and a UCI state is transmitted by selecting and transmitting one of a plurality of sequences.

(1) PUCCH Format 1 (PF1)

Supportable UCI payload size: up to K bits (e.g., K=2)

Number of OFDM symbols included in one PUCCH: Y to Z symbols (e.g., Y=4 and Z=14)

Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).

(2) PUCCH Format 2 (PF2)

Supportable UCI payload size: more than K bits (e.g., K=2)

Number of OFDM symbols included in one PUCCH: 1 to X symbols (e.g., X=2)

Transmission structure: UCI and a DMRS (DM-RS) are configured/mapped in/to the same symbol based on frequency division multiplexing (FDM), and encoded UCI bits are transmitted by applying only an inverse fast Fourier transform (IFFT) thereto with no DFT.

(3) PUCCH Format 3 (PF3)

Supportable UCI payload size: more than K bits (e.g., K=2)

Number of OFDM symbols included in one PUCCH: Y to Z symbols (e.g., Y=4 and Z=14)

Transmission structure: UCI and a DMRS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.

(4) PUCCH Format 4 (PF4 or F4)

Supportable UCI payload size: more than K bits (e.g., K=2)

Number of OFDM symbols included in one PUCCH: Y to Z symbols (e.g., Y=4 and Z=14)

Transmission structure: UCI and a DMRS are configured/mapped in/to different symbols based on TDM. The DFT is applied to encoded UCI bits with no multiplexing between UEs.

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g., OFDM symbol index) and length (e.g., the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

FIG. 5 illustrates an exemplary PUSCH transmission process. Referring to FIG. 5, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

1. Wireless communication system for supporting Non-Terrestrial Network (NTN)

Non-Terrestrial Network (NTN) refers to a network or a network segment, which is configured to use a radio resource in a satellite or an Unmanned Aircraft System (UAS) platform.

In order to ensure a wider coverage or to provide a wireless communication service in a place in which it is not easy to install a wireless communication BS, use of a non-terrestrial network (NR NTN) or LTE NTN service has been considered. An NR or LTE service as an existing terrestrial network (TN) service provides a wireless communication service to UEs by installing a corresponding BS on the ground, but the NTN service provides a wireless communication service to UEs by installing a BS at places on the ground, where an artificial satellite (a geostationary earth orbit, a low-earth orbit, a medium-earth orbit, etc.), an airplanes, an unmanned plane, a drone, or the like is not positioned rather than installing the BS on the ground.

FIG. 6 shows examples of scenarios of NTN that a UE is capable of accessing. FIG. 6(a) shows an example of an NTN scenario based on a transparent payload, and FIG. 6(b) shows an example of an NTN scenario based on a regenerative payload.

The NTN may be usually characterized by the following factors.

One or more sat-gateways for connecting the NTN to a common data network:

A Geostationary Earth Orbiting (GEO) satellite may be provided from one or more sat-gateways disposed in a coverage (e.g., regional or even continental coverage) targeted by a satellite. UEs within a cell may be assumed to be served by only one sat-gateway;

A non-GEO satellite may be successively served by one or more gat-gateways. A system may ensure a service and feeder link continuity between serving sat-gateways for a time period sufficient to proceed with mobility anchoring and handover.

Feeder link or wireless link between sat-gateway and satellite (or UAS platform)

Service link or wireless link between UE and satellite (or UAS platform)

Satellite (or UAS platform) for implementing one of transparent or regenerative (including onboard processing) payload. Satellite (or UAS platform) may generally generate multiple beams in a service area with a boundary defined by a field of view of the satellite (or UAS platform). The footprint of the beam may be generally elliptical. The field of view of the satellite (or UAS platform) may be determined according to an onboard antenna diagram and the minimum elevation angle.

Transparent payload: Radio frequency filtering, and frequency conversion and amplification. Thus, a waveform signal repeated by a payload is not changed.

Regenerative payload: Demodulation/decoding, switching and/or routing, coding/modulation as well as radio frequency filtering and frequency conversion and amplification. This is practically equivalent to having all or some of functions of a BS (e.g., gNB) on a satellite (or UAS platform).

Inter-satellite links (ISL) in the case of a satellite group. To this end, the satellite requires a regeneration payload. The ISLs may operate at an RF frequency or a wide band.

A UE may be served by a satellite (or UAS platform) within a target service area.

Table 8 below shows an example of types of a satellite (or UAS platform).

TABLE 8

| Platforms | Altitude range | Orbit | Typical beam footprint size |
| --- | --- | --- | --- |
| Low-Earth Orbit (LEO) satellite | 300-1500 km | Circular around the earth | 100-1000 km |
| Medium-Earth Orbit (MEO) satellite | 7000-25000 km | | 100-1000 km |

TABLE 8-continued

| Platforms | Altitude range | Orbit | Typical beam footprint size |
|---|---|---|---|
| Geostationary Earth Orbit (GEO) satellite | 35 786 km | rotational station keeping position fixed in terms of elevation/azimuth with respect to a given earth point | 200-3500 km |
| UAS plarform (including HAPS) | 8-50 km (20 km for HAPS) | | 5-200 km |
| High Elliptical Orbit (HEO) satellite | 400-50000 km | Elliptical around the earth | 200-3500 km |

Generally,

The GEO satellite and the UAS may be used to provide a continental, regional, or local service.

A Low Earth Orbiting (LEO) and Medium Earth Orbiting (MEO) group may be used to provide a service in both the Northern and Southern Hemispheres. In some cases, constellation may also provide global coverage including a polar region. For later, an appropriate orbital inclination, sufficient generated beams, and inter-satellite links may be required.

A Highly Elliptical Orbiting (HEO) satellite system may also be considered.

Hereinafter, a wireless communication system in an NTN including the following six reference scenarios will be described.

Circuit orbit and nominal station keeping platform

Highest Round Trip Delay (RTD) constraint

Highest Doppler constraint

Transparent or regenerative payload

One case with ISL and one case without ISL. In the case of inter-satellite link, a regenerative payload may be required.

Fixed or steerable beams causing a moving or fixed footprint on the ground.

Six reference scenarios are considered in Tables 9 and 10.

TABLE 9

| | Transparent satellite | Regenerative satellite |
|---|---|---|
| GEO based non-terrestrial access network | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

TABLE 10

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Max channel bandwidth capability (service link) | 30 MHz for band <6 GHz<br>1 GHz for band >6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes/No (Both cases are possible.) |
| Earth-fixed beams | Yes | Scenario C1: Yes (steerable beams), see note 1<br>Scenario C2: No (the beams move with the satellite)<br>Scenario D 1: Yes (steerable beams), see note 1<br>Scenario D 2: No (the beams move with the satellite) |
| Max beam foot print size (edge to edge) regardless of the elevation angle | 3500 km (Note 5) | 1000 km |
| Min Elevation angle for both sat-gateway and user equipment | 10° for service link and 10° for feeder link | 10° for service link and 10° for feeder link |
| Max distance between satellite and user equipment at min elevation angle | 40,581 km | 1,932 km (600 km altitude)<br>3,131 km (1,200 km altitude) |

TABLE 10-continued

| | | |
|---|---|---|
| Max Round Trip Delay (propagation delay only) | Scenario A: 541.46 ms (service and feeder links) Scenario B: 270.73 ms (service link only) | Scenario C: (transparent payload: service and feeder links) 25.77 ms (600 km) 41.77 ms (1200 km) Scenario D: (regenerative payload: service link only) 12.89 ms (600 km) 20.89 ms (1200 km) |
| Max differential delay within a cell (Note 6) | 10.3 ms | 3.12 ms and 3.18 ms for respectively 600 km and 1200 km |
| Max Doppler shift (earth fixed user equipment) | 0.93 ppm | 24 ppm (600 km) 21 ppm(1200 km) |
| Max Doppler shift variation (earth fixed user equipment) | 0.000 045 ppm/s | 0.27 ppm/s (600 km) 0.13 ppm/s(1200 km) |
| User equipment motion on the earth | 1200 km/h (e.g. aircraft) | 500 km/h (e.g. high speed train) Possibly 1200 km/h (e.g. aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 20 W | |
| User equipment Noise figure | Omnidirectional antenna: 7 dB Directive antenna: 1.2 dB | |
| Service link | 3GPP defined New Radio | |
| Feeder link | 3GPP or non-3GPP defined Radio interface | 3GPP or non-3GPP defined Radio interface |

Reference 1: Each satellite may steer a beam to a fixed point on the Earth by using beamforming technology. This may be applied for a time corresponding to visibility of the satellite.

Reference 2: The max delay variation in the beam (UE fixed on the ground) may be calculated based on the minimum elevation angle (Min Elevation angle) for both the gateway and the UE.

Reference 3: The maximum differential delay in the beam may be calculated based on a diameter of the maximum beam footprint at the lowest point (at nadir).

Reference 4: The speed of light used to calculate the delay may be 299,792,458 m/s.

Reference 5: The size of the maximum beam footprint of the GEO may be determined based on GEO High Throughput system technology of the current state under the assumption that there is a spot beam at a coverage edge (low altitude).

Reference 6: The maximum differential delay at a cell level may be calculated in consideration at a beam level delay for the largest beam size. When the size of the beam is small or medium, the cell may include two or more beams. However, the cumulative differential delay of all beams in the cell may not exceed the maximum differential delay at a cell level in Table 10.

The NTN-related description of the present specification may be applied to an NTN GEO scenario and any non-geostationary orbit (NGSO) scenario having a circuit orbit with an altitude equal to or greater than 600 km.

2. Random Access Procedure

FIG. 7 illustrates random access procedures. FIG. 7(a) illustrates the contention-based random access procedure, and FIG. 7(b) illustrates the dedicated random access procedure.

Referring to FIG. 7(a), the contention-based random access procedure includes the following four steps. The messages transmitted in steps 1 to 4 may be referred to as message 1 (Msg1) to message 4 (Msg4), respectively.

Step 1: The UE transmits an RACH preamble on a PRACH.

Step 2: The UE receives a random access response (RAR) on a DL-SCH from the BS.

Step 3: The UE transmits a Layer 2 (L2)/Layer 3 (L3) message on a UL-SCH to the BS.

Step 4: The UE receives a contention resolution message on the DL-SCH from the BS.

The UE may receive random access information in system information from the BS.

When the UE needs random access, the UE transmits an RACH preamble to the BS as in step 1. The BS may identify each RACH preamble by a time/frequency resource (RACH occasion (RO)) in which the RACH preamble is transmitted, and a preamble index (PI).

Upon receipt of the RACH preamble from the UE, the BS transmits an RAR message to the UE as in step 2. To receive the RAR message, the UE monitors an L1/L2 PDCCH with a cyclic redundancy check (CRC) masked with a random access-RNTI (RA-RNTI), including scheduling information for the RAR message, within a preconfigured time window (e.g., ra-ResponseWindow). The PDCCH masked with the RA-RNTI may be transmitted only in a common search space. When receiving a scheduling signal masked with the RA-RNTI, the UE may receive an RAR message on a PDSCH indicated by the scheduling information. The UE then checks whether there is RAR information directed to the UE in the RAR message. The presence or absence of the RAR information directed to the UE may be determined by checking whether there is a random access preamble ID (RAPID) for the preamble transmitted by the UE. The index of the preamble transmitted by the UE may be identical to the RAPID. The RAR information includes the index of the corresponding RACH preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)).

Upon receipt of the RAR information, the UE transmits UL-SCH data (Msg3) on a PUSCH according to the UL scheduling information and the timing offset value, as in step 3. Msg3 may include the ID (or global ID) of the UE. Alternatively, Msg3 may include RRC connection request-related information (e.g., RRCSetupRequest message) for initial access. In addition, Msg3 may include a buffer status report (BSR) on the amount of data available for transmission at the UE.

After receiving the UL-SCH data, the BS transmits a contention resolution message (Msg4) to the UE as in step 4. When the UE receives the contention resolution message and succeeds in contention resolution, the TC-RNTI is changed to a C-RNTI. Msg4 may include the ID of the UE and/or RRC connection-related information (e.g., an RRC-Setup message). When information transmitted in Msg3 does not match information received in Msg4, or when the UE has not received Msg4 for a predetermined time, the UE may retransmit Msg3, determining that the contention resolution has failed.

Referring to FIG. 7(b), the dedicated random access procedure includes the following three steps. Messages transmitted in steps 0 to 2 may be referred to as Msg0 to Msg2, respectively. The BS may trigger the dedicated random access procedure by a PDCCH serving the purpose of commanding RACH preamble transmission (hereinafter, referred to as a PDCCH order).

Step 0: The BS allocates an RACH preamble to the UE by dedicated signaling.

Step 1: The UE transmits the RACH preamble on a PRACH.

Step 2: The UE receives an RAR on a DL-SCH from the BS.

Steps 1 and 2 of the dedicated random access procedure may be the same as steps 1 and 2 of the contention-based random access procedure.

In NR, DCI format 1_0 is used to initiate a non-contention-based random access procedure by a PDCCH order. DCI format 1_0 is used to schedule a PDSCH in one DL cell. When the CRC of DCI format 1_0 is scrambled with a C-RNTI, and all bits of a "Frequency domain resource assignment" field are 1s, DCI format 1_0 is used as a PDCCH order indicating a random access procedure. In this case, the fields of DCI format 1_0 are configured as follows.

RA preamble index: 6 bits

UL/supplementary UL (SUL) indicator: 1 bit. When the bits of the RA preamble index are all non-zeroes and SUL is configured for the UE in the cell, the UL/SUL indicator indicates a UL carrier in which a PRACH is transmitted in the cell. Otherwise, it is reserved.

SSB (Synchronization Signal/Physical Broadcast Channel) index: 6 bits. When the bits of the RA preamble index are all non-zeroes, the SSB indicator indicates an SSB used to determine an RACH occasion for PRACH transmission. Otherwise, it is reserved.

PRACH mask index: 4 bits. When the bits of the RA preamble index are all non-zeroes, the PRACH mask index indicates an RACH occasion associated with the SSB indicated by the SSB index. Otherwise, it is reserved.

Reserved: 10 bits

When DCI format 1_0 does not correspond to a PDCCH order, DCI format 1_0 includes fields used to schedule a PDSCH (e.g., a time domain resource assignment, a modulation and coding scheme (MCS), an HARQ process number, a PDSCH-to-HARQ feedback timing indicator, and so on).

2-Step Random Access Procedure

In the prior art, random access is performed by a 4-step procedure as described above. In the legacy LTE system, an average of 15.5 ms is required for the 4-step random access procedure.

TABLE 11

| Component | Description | Time (ms) |
|---|---|---|
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C-RNTI assignment + L1 encoding of RRC Connection Request | 5 |
| 6 | Transmission of RRC and NAS Request | 1 |
| 7 | Processing delay in eNB (L2 and RRC) | 4 |
| 8 | Transmission of RRC Connection Set-up (and UL grant) | 1 |

The NR system may require lower latency than conventional systems. When random access occurs in a U-band, the random access may be terminated, that is, contention may be resolved only if the UE and BS sequentially succeed in LBT in all steps of the 4-step random access procedure. If the LBT fails even in one step of the 4-step random access procedure, resource efficiency may decrease, and latency may increase. If the LBT fails in a scheduling/transmission process associated with Msg2 or Msg3, the resource efficiency may significantly decrease, and the latency may significantly increase. For random access in an L-band, low latency may be required in various scenarios of the NR system. Therefore, a 2-step random access procedure may be performed in the L-band as well.

As illustrated in FIG. 8(a), the 2-step random access procedure may include two steps: transmission of a UL signal (referred to as MsgA) from the UE to the BS and transmission of a DL signal (referred to as MsgB) from the BS to the UE.

The following description focuses on the initial access procedure, but the proposed methods may be equally applied to the random access procedure after the UE and BS establish an RRC connection. Further, a random access preamble and a PUSCH part may be transmitted together in a non-contention random access procedure as shown in FIG. 8(b).

While not shown, the BS may transmit a PDCCH for scheduling Msg. B to the UE, which may be referred to as a Msg. B PDCCH.

3. Common TA in NTN

The contents (NR frame structure, NTN system, etc.) described above may be applied in combination with methods proposed in the present specification described later, or may be supplemented in clarifying the technical features of the methods proposed in the present specification.

In addition, the methods described later are related to UpLink (UL) transmission and can be equally applied to a DownLink (DL) signal transmitting method in the NR or LTE system described above, and the technical ideas proposed in the present specification can be modified or substituted to fit the terms, expressions, structures, etc. defined in each system so as to be implemented in the corresponding system.

The frequency bands considered for NR NTN services are mainly 2 GHz band (S-band: 2~4 GHz) in the 6 GHz or lower band, and DL 20 GHz and UL 30 GHz band (Ka-Band: 26.5~40 GHz) in the 6 GHz or higher band.

Table 10 discloses the maximum Round Trip Delay for each scenario.

As described above, the NR NTN service is largely categorized into two schemes. FIG. 9 (*a*) illustrates a regenerative payload scheme. FIG. 9 (*b*) illustrates a transparent payload scheme. The regenerative payload scheme is a scheme in which a satellite itself can serve as a base station. The transparent payload scheme is a scheme in which a satellite receives a payload from a base station on the ground and transmits the corresponding signal to a UE.

Referring to FIG. 9, a method of defining a common TA (i.e., a common TA refers to a common component of propagation delay shared by all UEs within the coverage of the same satellite beam/cell) is set differently according to two schemes of the NTN service. That is, in the regenerative payload scheme, a value obtained by calculating the delay of a service link is included in the common TA. In the transparent payload scheme, a value calculated by calculating a delay including a feeder link in a service link is included in the common TA. The service link refers to a link between a satellite and a reference point. The feeder link refers to a link between a satellite and a base station located on the ground.

In this situation, the following two options are considered in relation to TA acquisition.

Option 1: Autonomous acquisition of the TA at UE with UE known location and satellite ephemeris Option 2: Timing Advanced (TA) adjustment based on network indication Option 1 refers to a method in which a UE knows an orbit and location of a satellite, a UE's own location, etc. and compensates for a full TA (i.e., common TA+UE specific differential TA) based on the known values, or a common TA is indicated by a base station and compensates only for a UE-specific TA.

Option 2 refers to a method of receiving an indication of a common TA from a base station, progressing an RACH procedure based on the indicated common TA, and receiving a UE-specific differential TA through a TA command field of an RAR MAC CE.

The above two options include a method of indicating a common TA by a base station. Hereinafter, an operation required by a base station to signal a common TA, an operation of receiving a common TA by a UE, a specific method for signaling a common TA, and the like are proposed.

FIG. 10 shows an example of a common TA. In the present specification, a common TA refers to a TA applied between a satellite and a reference point. Referring to FIG. 10, a reference point RP is located between a base station and a satellite, that is, in a feeder link. One reference point existing between the base station and the satellite may be commonly applied to one or more UEs connected to the satellite. Likewise, a common TA may be commonly applied to one or more UEs communicating with the corresponding satellite between the reference point and the satellite. A TA applied between a satellite and a UE may be referred to as a UE-specific TA.

3.1. Common TA Signalling by gNB

When a base station signals a common TA to a UE, the following methods may be considered.

[Method 1: A Method of Indicating a Plurality of Common TA Series by a Base Station]

In a geostationary satellite, a base station appears to be fixed from the perspective of a UE on the ground. Therefore, it may be determined that a common TA does not change. However, a satellite located at a lower altitude (e.g., a low orbital such as LEO) than a geostationary satellite may not have a long available service time because it has a fast orbital velocity. The available service time may be a time provided to the UE by the satellite as a base station. The available service time is 15 to 20 minutes based on LEO, which can be very short depending on a satellite speed. Since the base station (e.g. satellite, etc.) seems to be moving at a very high speed from the perspective of the UE on the ground, which receives an NTN service from the corresponding satellite, it may be unreasonable to continue to use the common TA value indicated by the base station at a specific timing point.

To solve this issue, when the base station informs the UE of the common TA value, a plurality of common TA values (e.g., defined according to a flow if time) defined according to a specific rule may be delivered. Typically, the base station operating in the transparent payload scheme may determine in advance when a feeder link is changed, calculate a plurality of the common TA values so that the TA value for the changed feeder link is reflected, and transmit the calculated TA values to the UE. The series of the common TA values may be notified by the base station to the UE through higher layer signaling (e.g., SIB, dedicated RRC signaling) and/or group common DCI (e.g., DCI format 2_x series, etc.) in common to a cell or a UE group.

As an example of a plurality of common TA values defined according to a flow of time, it is assumed that a low-orbit satellite (LEO) provides a service to a UE for 20 minutes. A base station may calculate a common TA value for 20 minutes of the corresponding satellite one by one for each X sec (e.g., X=1 or 0.5) to configure a common TA series including a plurality of TA values, and inform the UE of the configured common TA series. Alternatively, the UE may calculate a common TA series during a signaling reconfiguration duration (e.g., SIB reconfiguration time) and inform the UE of the calculated common TA series.

Additionally, when a base station indicates a common TA, it may inform a UE of a common TA for each beam. Thus, common TA values may be indicated as different common TA series for a plurality of beams, respectively. Typically, in SIB, a representative common TA value during an SIB reconfiguration time is indicated for each beam. The base station may indicate a common TA series to a UE and/or a UE group having entered a connected mode through dedicated RRC signaling, UE group common DCI, etc.

Additionally, as a method of indicating a plurality of common TAs, a representative common TA value may be indicated, and a delta TA value for a change of a common TA value according to a time may be additionally indicated. For example, the representative common TA during a specific time (e.g., SIB reconfiguration time) may be provided with a value calculated based on an initial timing, and a delta TA value, which is a common TA change value per x ms or y us, may be additionally indicated. Upon receiving this, a UE may determine a common TA value at a specific timing point in time by adding delta TA*x (ms) or delta TA*y (us) to the representative common TA value (i.e., by correcting (delta*time in a common TA). The UE may perform UL transmission (e.g., RACH procedure) based on the determined common TA value. Additionally, a base station indicates a representative common TA value, and the UE may update the common TA with a function using trajectory, velocity, location and the like of the base station (i.e., satellite).

Additionally, a base station may inform a UE of only a representative common TA as a common TA value, and a UE-specific differential TA value may be indicated through a TA command of an RAR grant. According to this configuration, there is an advantage that a payload to be included in higher layer signaling by the base station may be reduced. In this case, during the existing RACH procedure operation, a step size in the TA command of the RAR grant may be increased, or a negative value needs to be set as well as ae positive value in the TA command.

[Method 2: Method of Using a Common TA Value as a Value Known in Advance Between a Base Station and a UE]

Meanwhile, in a situation where autonomous acquisition of a TA by a UE is defined as a basic operation like Method 1, a low cost UE may not support the corresponding autonomous acquisition capability. A base station may set a UE, which does not have the autonomous acquisition capability, not to access a corresponding cell, but it may be desirable to support the low cost UE to provide an NTN service in terms of network operation.

A UE that has not acquired a common TA may transmit a PRACH preamble with an initial TA value set to 0. However, due to the nature of the NTN system with a large round trip delay, if the initial TA value is set to 0 and an RACH procedure is performed, RAR window and Random Access-Radio Network Temporary Identifier (RA-RNTI) values may not operate at the currently defined values.

Accordingly, for a UE without autonomous acquisition capability, a default common TA value and/or a minimum common TA value may be predefined between a base station and the UE. For example, the default common TA value and/or the minimum common TA value may be predefined between the UE and the base station according to the orbit, altitude, speed, and the like of a satellite. In addition, the default common TA value and/or the minimum common TA value may be defined in advance between the UE and the base station depending on a type of the satellite (e.g., LEO, HEO, etc.), a frequency band used by the satellite, etc.

The UE may perform initial access using the predefined default common TA value and/or the predefined minimum common TA value. When the UE transmits a PRACH preamble using the default common TA value and/or the minimum common TA value, the base station may receive the corresponding preamble, transmit an RAR corresponding thereto, and indicate an additional TA value to the UE through a TA command field in the RAR.

Currently, a common TA that a base station can indicate/configure to offset a round trip delay between a reference point and a satellite is being discussed. A method of tracking a change of a common TA over time by a UE has not been discussed. Hereinafter, a method of updating a common TA in consideration of a change in the common TA over time and a method of overriding a common TA value on updating through two or more channels/signaling and the like are proposed.

[Method 3: Common TA Updating and Overriding Method]

Method 3-1: Common TA Update

Proposed Method 3-1-1: A common TA and/or a TA drift rate may be configured to be updated for each predefined period.

For example, if a common TA and/or a TA drift rate is indicated through SIB1, the common TA and/or the TA drift rate may be updated for each SIB1 reconfiguration period.

In this case, a reference time of the common TA may be defined in advance. For example, the reference time of the common TA may be configured to coincide with a start timing point of the SIB1 reconfiguration period.

As another example, it may be indicated and/or configured to update a common TA and/or a drift rate in the same manner as an ephemeris information update period of a satellite. For example, the reference time of the common TA may be configured to coincide with a start point of the ephemeris information update period of the satellite.

If the above method is expressed mathematically, it may be as shown in the example below.

$$\text{Current\_common\_}TA = \text{past\_common\_}TA + \text{drift rate} * \text{time duration}$$

In this case, past_common_TA is the most recently updated common TA. In addition, the time duration is an interval between a reference time for past_common_TA and a current reference time.

Proposed Method 3-1-2: In this method, a common TA and a TA draft rate are indicated and a reference time stamp for the common TA is additionally indicated.

For one example, through SIB-x and/or RRC signaling and/or MAC-CE, a common TA and/or a TA draft rate is indicated and a reference time stamp for the common TA is additionally indicated. In this case, the common TA, the TA drift rate, and/or the reference time stamp is updated through new signaling (e.g., SIB-x and/or RRC signaling and/or MAC-CE) indicated from a base station.

For another example, a common TA and/or a TA drift rate may be indicated through SIB1, and a reference time stamp for the common TA may be additionally indicated. In this case, the common TA, the TA drift rate, and/or the reference time stamp is updated for each SIB1 reconfiguration period.

Method 3-2. Common TA and/or TA Drift Rate Override

When a base station is able to inform a UE of a common TA and/or TA drift rate through SIB1 and/or SIB-x and/or RRC signaling and/or MAC-CE, etc. the UE may override parameters through the following operation.

For example, if a common TA and/or a TA drift rate is transmitted from a base station through SIB1 and the common TA and/or the MAC-CE is updated later through RRC signaling (or SIB-x and/or MAC-CE), a UE tracks the common TA using a value updated through RRC signaling (or SIB-x and/or MAC-CE) (by ignoring the common TA and/or the TA drift rate acquired through the SIB1). In this case, the base station may provide an update period for the common TA and/or the TA drift rate in advance. If the common TA and/or the TA drift rate is not updated according to the update period provided by the base station, the UE determines that the current common TA and/or TA drift rate is no longer valid and is configured to use the common TA and/or the TA draft rate value of the SIB1 again. Alternatively, the UE determines that additional update is not required for the current common TA and/or TA drift rate, and is configured to continue to use the current common TA and/or TA drift rate value.

For another example, if a common TA and/or a TA drift rate is transmitted from a base station through SIB1 and the common TA and/or the TA drift rate is not updated through RRC signaling (or SIB-x and/or MAC-CE), a UE is configured to check and apply a presence or non-presence of an update of the common TA and/or TA drift rate every SIB1 reconfiguration period.

Typically, when a UE entering a connected mode receives an update of a common TA and/or a TA drift rate through UE-specific RRC signaling, the following UE operation may be required. For example, if a Content Based RACH (CBRA) is required (e.g., when a PDCCH order-based RACH procedure is indicated through CBRA), the UE may be configured to recalculate a TA using the common TA and/or TA drift rate value indicated through SIB1. Thereafter, the UE may transmit a PRACH preamble using the calculated TA value. Alternatively, if Content Free RACH (CFRA) is required (e.g., when a PDCCH order-based RACH procedure is indicated through CFRA), the UE may be configured to calculate a TA as it is using the common TA and/or TA drift rate updated through the existing UE-specific RRC signaling. Thereafter, the UE may transmit a PRACH preamble using the calculated TA value.

Although the proposed methods have been described based on a serving satellite, the same method may be applied to a target satellite during handover and/or serving satellite change. Additionally, a common TA and/or a TA drift rate for the target satellite (upcoming satellite) at the time of handover and/or serving satellite change may be configured and/or indicated separately from a value corresponding to the serving satellite.

3.2. A Method of Configuring an RO by a Base Station for a UE Failing to Acquire a Common TA Even if it is assumed that a base station does not transmit a common TA and that a UE may autonomously acquire a common TA, a low cost UE may not support autonomous acquisition capability. If so, some UEs may acquire a common TA but other UEs may not acquire a common TA. Accordingly, in this situation, the base station may configure an RO using the following method to efficiently manage an RACH slot.

A UE failing to acquire a common TA may set an initial TA value to 0 and transmit a PRACH preamble. The UE may transmit the PRACH preamble using the initial TA value as a default TA value, as shown in Method 2. An initial TA refers to a value set as an initial TA value by the UE performing an RACH procedure. The default TA value refers to a specific value preconfigured to be used as an initial TA value for a RACH procedure or the like between the base station and the UE.

[Method 4: A Method for a Base Station to Separately Indicate an RO for UEs Failing to Acquire a Common TA Through an PRACH Configuration Independent from the Existing PRACH Configuration (or Implicitly)]

Method 4 is a method of transmitting a PRACH preamble by selecting one from one or more ROs designated by an existing PRACH configuration by UEs having acquired a common TA and transmitting a PRACH preamble by selecting one from one or more ROs designated by a separately indicated PRACH configuration by UEs failing to acquire a common TA. The UE having acquired the common TA may be configured to ignore the separately indicated PRACH configuration (or invalid RO).

Meanwhile, the independent PRACH configuration may be used to indicate the RO for the UEs failing to acquire the common TA, but an RO for UEs failing to acquire the common TA may be defined so to be multiplexed (e.g., FDMed or TDMed) with the RO designated through the existing PRACH configuration. Considering the FDMed situation, the base station needs to indicate an RO FDM value of the existing PRACH configuration as a value excluding a maximum value in order to maintain and use a currently defined RA-RNTI value. For example, a current RO FDM value may indicate 1, 2, 4, or 8, so the maximum value of 8 is not indicated.

Additionally, the base station may be configured to indicate to the UE whether g ROs for UEs failing to acquire the common TA will exist by being TDMed and/or FDMed with the existing RO. In this case, the g value may be defined as an integer of 1 or more (for the base station to service all UEs). The UE may determine which a prescribed RO is an RO for UEs failing to acquire t the common TA using the indicated values.

For example, if ROs indicated by a base station are configured to be FDMed up to k (e.g., k=4) and it is indicated that g ROs (e.g., g=2) for UEs failing to acquire a common TA exist by being FDMed with the existing RO, the UEs failing to acquire the common TA may be configured to transmit a PRACH preamble by selecting one of $(k+1)^{th}$ (e.g., $5^{th}$) RO and $(k+2)^{th}$ (e.g., $6^{th}$) RO in the lower frequency order in a corresponding RACH slot.

According to Method 4, in the RO indicated by the existing PRACH configuration, since only the UE that has acquired the common TA may transmit the PRACH preamble, the existing RACH procedure may be maintained. However, in the additionally indicated RO (i.e., RO in which UEs failing to acquire the common TA transmit the PRACH preamble), since the UEs failing to acquire the common TA transmit the PRACH preamble, RAR windows and/or RA-RNTI values may be required additionally, or a gap between ROs or a gap between RAR windows may be required.

[Method 5: A Method of Configuring UEs Failing to Acquire a Common TA to Transmit a PRACH Preamble by Designating One or More ROs Among One or More ROs Indicated Through the Existing PRACH Configuration]

According to the configuration by Method 1, there is an advantage that a base station does not need to perform an additional operation for UEs having acquired a common TA, but there is a burden of configuring an additional RO for UEs failing to acquire a common TA. Therefore, by selecting one or more ROs from a plurality of the predefined ROs, the UEs failing to acquire the common TA may be configured to transmit a PRACH preamble through the selected ROs.

For example, if one RO is selected for UEs failing to acquire a common TA, the lowest (or highest) RO index, an RO located at the lowest (or highest) frequency, an RO located at the first (or last) timing and the like may be selected from the predefined ROs. Alternatively, a specific RACH slot may be indicated for UEs failing to acquire a common TA.

According to Method 5, a UE having acquired a common TA and a UE failing to acquire a common TA may coexist in a specific RO. For example, if UEs failing to acquire the common TA transmit a PRACH preamble by setting an initial TA value to 0, the UE having acquired the common TA may configure an RAR window and monitor an RAR by determining that the RAR window starts from a timing point that becomes double (or triple) of the common TA after transmitting Msg. 1. In addition, since a base station should receive the PRACH preamble of the UEs failing to acquire the common TA, it is necessary to configure a PRACH preamble reception period to be longer by the common TA. The UE failing to acquire the common TA transmits Msg. 1 by setting an initial TA value to 0 and then directly monitors the RAR window. In doing so, due to propagation delay, the RAR may be transmitted after at least double of the common TA. Therefore, in this case, the RAR window needs to be configured large for the UE failing to acquire the common TA.

To solve the above problem, as shown in Method 2, the UE failing to acquire the common TA may set a default TA value as the initial TA value and transmit Msg. 1. In addition, by determining that the RAR window starts from a timing point that becomes a double of the default TA, the UE failing to acquire the common TA may configure the RAR window and monitor the RAR. According to this configuration, there is an advantage that there is no need to configure a long interval for receiving a PRACH preamble from the perspective of the base station side. Since a TA difference between the UE having acquired the common TA and the UE that uses the default TA may not be so large, a size of the RAR window may not be configured large like the above example.

3.3. Operations of a Base Station and UE in a System Configured to Use a Common TA SSB-to-RO mapping related operation when using a common TA Basically, a common TA may be indicated for each beam. Therefore, when a plurality of e SSBs having different indexes are transmitted through different beams and if SSB-to-RO mapping is set to 1 to N (where N≥1), common TA values among a plurality of ROs may be set different from each other.

Meanwhile, when the SSB-to-RO mapping is set to N to 1 (where N≥1), UEs having different common TA values may transmit a PRACH preamble in a specific RO. A base station needs to configure a PRACH preamble reception interval based on a small common TA value among different common TA values. In addition, the base station may be configured to inform UEs attempting to transmit a PRACH preamble in a specific RO of all common TA values that will be used in the corresponding RO.

Typically, the largest common TA (or largest K offset) value used in the same RO may be commonly applied by all UEs that have transmitted the PRACH preamble in the corresponding RO, whereby an RAR window start timing may be determined. The K offset is applied only when an RAR is received. In transmitting and receiving other DL and/or UL signals/channels, the K offset configured for each common TA defined per SSB beam may be applied.

Alternatively, as the base station indicates/configures a common TA (or common K offset) value to be used in the same RO, all UEs transmitting a PRACH preamble in the corresponding RO may apply the common TA value to determine the start timing of the RAR window. The common K offset is applied only at the time of RAR reception, and in the case of transmitting and receiving other DL and/or UL signals/channels, a K offset configured for each common TA defined per SSB beam may be applied. Accordingly, the K offset may be indicated separately from the K offset configured per SSB (common TA). In addition, among the common TA values that an SSB index mapped to the corresponding RO has, the RAR window start point may be calculated based on the largest common TA value.

A specific example is described as follows. A plurality of SSB indexes (e.g., two SSB indexes) are mapped to the same RO. UE 1 and UE 2 assume common TA values corresponding to different SSB indexes as $TA_{UE1}$ and $TA_{UE2}$, respectively. The UE 1 and UE 2 assume that K offset values corresponding to different SSB indexes are $K_{UE1}$ and $K_{UE2}$, respectively. If the $TA_{UE2}$ is the largest value among the common TAs configured for the SSB indexes mapped to the RO, the UE 2 (having selected the SSB index corresponding to the corresponding TA) may configure that an RAR window starts according to a predefined processing time from a timing point of transmitting a PRACH preamble and/or a timing after a processing offset. Meanwhile, the UE 1 (having selected an SSB index corresponding to a common TA smaller than the $TA_{UE2}$) may configure that an RAR window starts after adding a delay amounting to $$\left\lceil \frac{TA_{UE2} - TA_{UE1}}{2} \right\rceil$$

$$\left( \text{or} \left\lfloor \frac{TA_{UE2} - TA_{UE1}}{2} \right\rfloor \right)$$

$$\text{or} \left( \left\lceil \frac{K_{UE2} - K_{UE1}}{2} \right\rceil \right)$$

$$\left( \text{or} \left\lfloor \frac{K_{UE2} - K_{UE1}}{2} \right\rfloor \right)$$

to a processing time predefined from a timing point of transmitting a PRACH preamble and/or a timing after a processing offset.

Alternatively, in a system such as NTN configured to use a common TA, SSB-to-RO mapping may always be set to 1-to-N (N≥1). If so, in the case of a specific RO, since a PRACH preamble is transmitted using a common TA value corresponding to the same beam, the existing RACH procedure may be used as it is.

A method of utilizing a common TA transmitted from a base station by a UE capable of autonomous acquisition.

Even when a UE is able to autonomously acquire a common TA, a base station may indicate a common TA value. The UE may use the indicated common TA value as an upper or lower bound to determine whether a directly calculated common TA value is valid. Alternatively, the UE may determine whether the directly calculated common TA value is valid by checking whether the directly calculated common TA value is within a predetermined range from the indicated common TA value. For example, if the directly calculated common TA value is smaller than or equal to the indicated common TA value by a threshold value, the UE may determine that the directly calculated common TA value is invalid and transmit a PRACH preamble using the indicated common TA value.

A method of separately indicating TA values of a feeder link and a service links A base station operating in the transparent payload scheme may inform a UE of a common TA value divided into a feeder link part and a service link part. This configuration has the advantage that when a satellite changes a feeder link, only the TA value corresponding to the feeder link can be additionally updated. In addition, if a feeder link change schedule and a TA value to be applied at the time of change are indicated to the UE in advance, a TA value corresponding to the feeder link may be updated according to the timing of the feeder link change, whereby the common TA may be updated.

A method of using a common TA value by acquiring it from a K-offset value

A UE receiving an indication of K-offset from a base station may acquire a common TA value from the K-offset. For example, the UE may acquire a common TA value using an equation such as 'Common TA=K-offset−UE specific differential TA (i.e., differential delay), etc.

During initial access, the UE uses a default common TA preconfigured between the base station and the UE or a representative common TA value indicated by the base station. When the K-offset value is indicated to the UE having entered a connected mode, the UE may calculate a common TA value from the corresponding K-offset. Thus, the calculated common TA may be used for a connected mode RACH procedure and the like.

A method of acquiring K-offset through information (e.g., common TA) indicated by a base station and/or information (e.g., UE-specific TA) acquired by a UE.

A UE may acquire its location information through Global Navigation Satellite System (GNSS) and calculate a delay (i.e., UE specific TA) between the UE and a satellite using satellite's orbit information. Thereafter, a base station broadcasts a delay (i.e., common TA) from a reference point configured by a network (in this case, the reference point refers to a reference point for the UE to match a UL/DL slot boundary) to the satellite. The UE may acquire the entire TA value by combining the corresponding common TA value and the UE-specific TA acquired by the UE.

In the above-described scenario, the UE may acquire a K-offset value based on the common TA value indicated from the base station and/or the UE-specific TA value acquired by the UE. According to this configuration, since the UE-specific TA value acquired by each UE may be slightly different, the K-offset values among the UEs may be acquired differently. Thereafter, the UE may report the acquired K-offset value (or UE-specific TA value or total TA value) to the base station. In this case, the UE may report the K-offset value acquired through an RO index, a preamble index, and/or the like to the base station. The base station may transmit a confirmation through an RAR whether the K-offset value (or UE-specific TA value or total TA value) reported from the UE is appropriate. If the TA value autonomously acquired by the UE is accurately acquired with a high probability, all 12 bits defined in the current NR system may not be required in a TA command field of the RAR. Therefore, the TA command field of the RAR may be reduced by N bits (e.g., N=1), and the base station may check whether the K-offset value reported by the UE with the corresponding N bits is appropriate. Alternatively, the K-offset value reported by the UE with the corresponding N bits may be finely adjusted. The UE may transmit Msg.3 PUSCH based on the information transmitted by the base station.

A method of indicating a K-offset by classifying it into a common K-offset and a residual K-offset In order to reduce the signaling overhead of a base station, a K-offset may be indicated in a manner of being classified into a common K-offset and a residual K-offset. In this case, the base station may transmit the common K-offset value through SIB or the like, and may transmit the residual K-offset value through an RAR, a UE-specific RRC signal, and/or the like. In addition, the common K-offset value may be configured cell-specific and/or beam-specific.

It is apparent that the examples of the proposed method described above may also be included as one of the implementation methods of the present specification, and thus may be regarded as some kind of proposed methods. In addition, the proposed methods described above may be implemented independently, but may also be implemented in the form of a combination (or merger) of some proposed methods. The rules may be defined so that a base station informs a UE through a predefined signal (e.g., a physical layer signal, or a higher layer signal) of whether the proposed methods are applied (or information on the rules of the proposed methods). A higher layer may include, for example, one or more of functional layers such as MAC, RLC, PDCP, RRC, and SDAP.

Methods, embodiments, or descriptions for implementing the method proposed in the present specification may be separately applied, or one or more methods (or embodiments or descriptions) may be applied in combination.

Implementation Example

FIG. 11 is a flowchart of a signal transmitting/receiving method according to embodiments of the present disclosure.

Referring to FIG. 11, embodiments of the present invention may be performed by a UE, and may include a step S1101 of receiving information on a common TA value and a step S1103 of communicating with a base station based on the common TA value. Although not illustrated, a method performed by a base station may include a step of transmitting information on a common TA value and a step of communicating with a UE based on the common TA value.

The UE may acquire a common TA value based on one or more combinations of Methods 1 to 5 and communicate with the base station based on the acquired common TA value. The base station may also deliver a common TA value to the UE based on a combination of one or more of Methods 1 to 5 and communicate with the UE based on the delivered common TA value. In a system in which a common TA is used, the operations of the UE and the base station may be performed by a combination of one or more of the operations of Section 3.3.

For example, the UE may receive information on a plurality of common TA values to be used during a specific time interval based on Method 1. A plurality of the common TA values may be referred to as a common TA series. The common TA value refers to a TA value applied between a satellite and a reference point, as described with reference to FIG. 10. The common TA value may be commonly applied to UEs connected to the satellite.

Specifically, the information on the common TA value may include information on N common TA values for a specific time interval divided into N time intervals. For example, the base station may divide a specific time interval into X-second units and inform the UE of the common TA values of the number N of the divided time intervals as a common TA series. In the present specification, the X value does not necessarily have to be an integer and may be a specific rational number. Alternatively, the X value may match one or more symbols, slots, and/or subframe lengths.

Alternatively, the information on the common TA values may include a representative common TA value and a delta TA value, and during a specific time interval, the common TA value may increase by a delta TA value from the representative common TA value at each configured time interval. For example, when the base station delivers the representative common TA value and the delta TA value to the UE, the UE initially uses the representative common TA value as a common TA value to be applied to the UE itself. Thereafter, when X seconds elapses, the representative common TA value is increased by a delta TA, and the increased value is used as a common TA value. The UE may use a common TA value increased by a delta TA value every X seconds.

Alternatively, the information on the common TA values may include a representative common TA value. And, during a specific time interval, the common TA value may be determined by updating the representative common TA value based on orbit, velocity, and/or location of a satellite. For example, the base station transmits information on the representative common TA value to the UE. The UE initially uses the representative common TA value as a common TA value to be applied to the UE itself. The UE may update the representative common TA value every X seconds based on the orbit, velocity, and/or location of the satellite, and may use the updated value.

The information on the common TA values may include information on a plurality of common TA values to be used during a specific time interval for each beam. For example, the information on the common TA values may include the common TA series as many as the number of beams transmitted by the base station. In addition, the information on the common TA values may include information indicating that each of the common TA series is mapped to which beam.

In addition to the operation described with respect to FIG. 11, one or more of the operations described with reference to FIGS. 1 to 10 and/or the operations described with reference to Sections 3.1 to 3.3 may be combined and additionally performed.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 12 illustrates a communication system 1 applied to the present disclosure.

Referring to FIG. 12, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g., V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

FIG. 13 illustrates wireless devices applicable to the present disclosure.

Referring to FIG. 13, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 12.

The first wireless device 100 may include one or more processors 102 and one or more memories 104, and further include one or more transceivers 106 and/or one or more antennas 108. The processor(s) 102 may control the memory (s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

FIG. 14 illustrates another example of a wireless device applied to the present disclosure. The wireless device may be implemented in various forms according to a use case/service (refer to FIG. 12).

Referring to FIG. 14, wireless devices 100 and 200 may correspond to the wireless devices 100 and 200 of FIG. 13 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcasting terminal, a hologram device, a public safety device, an MTC device, a medical device, a FinTech device (or a finance device), a security device, a climate/environment device, the AI server/device (400 of FIG. 12), the BSs (200 of FIG. 12), a network node, or the like. The wireless device may be mobile or fixed according to a use case/service.

In FIG. 14, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Example of Vehicle or Autonomous Driving Vehicle to which the Present Disclosure is Applied FIG. 15 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

What is claimed is:

1. A method of transmitting and receiving signals by a user equipment supportive of a Non-Terrestrial Network (NTN) in a wireless communication system, the method comprising:
   receiving System Information Block (SIB) including NTN-specific parameters for a serving cell,
   wherein the NTN-specific parameters for the serving cell includes (i) a parameter for a common Timing Advance (TA) value and (ii) a parameter for a drift rate of the common TA value;
   determining a TA value related to a serving satellite for the serving cell based on the first common TA value, the drift rate, a specific time and a current time; and
   transmitting a signal based on the TA value related to the serving satellite,
   wherein the common TA value is a timing offset that is equal to a Round Trip Time (RTT) between the serving satellite and a reference point, where the reference point is located in a feeder link.

2. The method of claim 1, wherein the specific time is a reference time related to the common TA value, and
   wherein a parameter for the specific time is included in the SIB.

3. The method of claim 1,
   wherein the SIB further includes a parameter for an ephemeris of the serving satellite, and
   wherein the TA value related to the serving satellite is determined based on a position of the serving satellite by the ephemeris and a position of the UE.

4. A user equipment supportive of a Non-Terrestrial Network (NTN) to transmit and receive signals in a wireless communication system, the user equipment comprising:
   at least one transceiver;
   at least one processor; and
   at least one memory operably connected to the at least one processor and storing instructions enabling the at least one processor to perform a specific operation when executed, the specific operation comprising:
   receiving System Information Block (SIB) including NTN-specific parameters for a serving cell,
   wherein the NTN-specific parameters for the serving cell includes (i) a parameter for a common Timing Advance (TA) value and (ii) a parameter for a drift rate of the common TA value;
   determining a TA value related to a serving satellite for the serving cell based on the first common TA value, the drift rate, a specific time and a current time; and
   transmitting a signal based on the TA value related to the serving satellite,
   wherein the common TA value is a timing offset that is equal to a Round Trip Time (RTT) between the serving satellite and a reference point, where the reference point is located in a feeder link.

5. The user equipment of claim 4,
   wherein the information the specific time is a reference time related to the common TA value, and
   wherein a a parameter for the specific time is included in the SIB.

6. The user equipment of claim 4,
   wherein the SIB further includes a parameter for a ephemeris of the serving satellite, and
   wherein the TA value related to the serving satellite is determined based on a position of the serving satellite by the ephemeris and a position of the UE.

* * * * *